(12) United States Patent
Chang et al.

(10) Patent No.: US 10,448,754 B1
(45) Date of Patent: Oct. 22, 2019

(54) CLAMP (71) Applicant: Door & Window Hardware Co., Taichung (TW)

(72) Inventors: Wei-Hung Chang, Taichung (TW); Ko-Yu Chang, Taichung (TW)

(73) Assignee: Door & Window Hardware Co., Taichung (TW)

( * ) Notice: Subject to any disclaimer, the term of this patent is extended or adjusted under 35 U.S.C. 154(b) by 0 days.

(21) Appl. No.: 16/149,403

(22) Filed: Oct. 2, 2018

(51) Int. Cl.
*A47F 3/12* (2006.01)
*F16B 2/02* (2006.01)

(52) U.S. Cl.
CPC . *A47F 3/12* (2013.01); *F16B 2/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,054,268 A * | 10/1977 | Sher | ................... | E04F 11/1812 256/24 |
| 6,912,818 B2 * | 7/2005 | Sprague | ................... | E06B 3/02 52/204.56 |
| 9,453,357 B1 * | 9/2016 | Bertato | ................... | E04H 17/16 |
| 9,777,484 B2 * | 10/2017 | Header | ................ | E04F 11/1853 |
| 9,995,043 B2 * | 6/2018 | Bierman | ............. | E04F 11/1812 |
| 10,184,267 B2 * | 1/2019 | Kuo | ...................... | E04H 17/168 |
| 2006/0070318 A1 * | 4/2006 | Chen | ..................... | E06B 3/5454 52/204.65 |
| 2006/0284522 A1 * | 12/2006 | Burke | ....................... | A47F 3/12 312/116 |
| 2010/0275410 A1 * | 11/2010 | Chang | ................... | E05D 5/0246 16/277 |
| 2011/0210299 A1 * | 9/2011 | Procter | ............... | E04F 11/1812 256/65.14 |
| 2012/0227339 A1 * | 9/2012 | Reinecke | ............ | E04F 11/1812 52/234 |
| 2012/0235102 A1 * | 9/2012 | Schopf | .................... | E04H 17/16 256/24 |
| 2012/0318469 A1 * | 12/2012 | Motosko | ................... | E06B 9/52 160/382 |
| 2015/0043965 A1 * | 2/2015 | Mao-Cheia | ........... | E06B 3/5481 403/338 |
| 2017/0037653 A1 * | 2/2017 | Schopf | .................... | E04H 17/22 |

* cited by examiner

*Primary Examiner* — Monica E Millner
(74) *Attorney, Agent, or Firm* — TraskBritt (57) ABSTRACT

A clamp includes two clamping units spaced apart from each other, each of which includes a supporting mount, a tightening block and a tightening bolt. The supporting mount has an inclined guide face which faces an object to be clamped, and two through holes through which two fasteners respectively extend to engage an installation plane. The tightening block has a sliding face abutting against the inclined guide face, and is fastened on the supporting mount by the tightening bolt. A threaded portion of the tightening bolt passes through a passage hole of the tightening block to engage an engagement hole of the supporting mount, so that the tightening block is compelled by the tightening bolt to move along the inclined guide face.

7 Claims, 10 Drawing Sheets

CLAMP

FIELD

The disclosure relates to a clamp, and more particularly to a clamp for clamping an object, such as a piece of glass.

BACKGROUND

Figure 1:
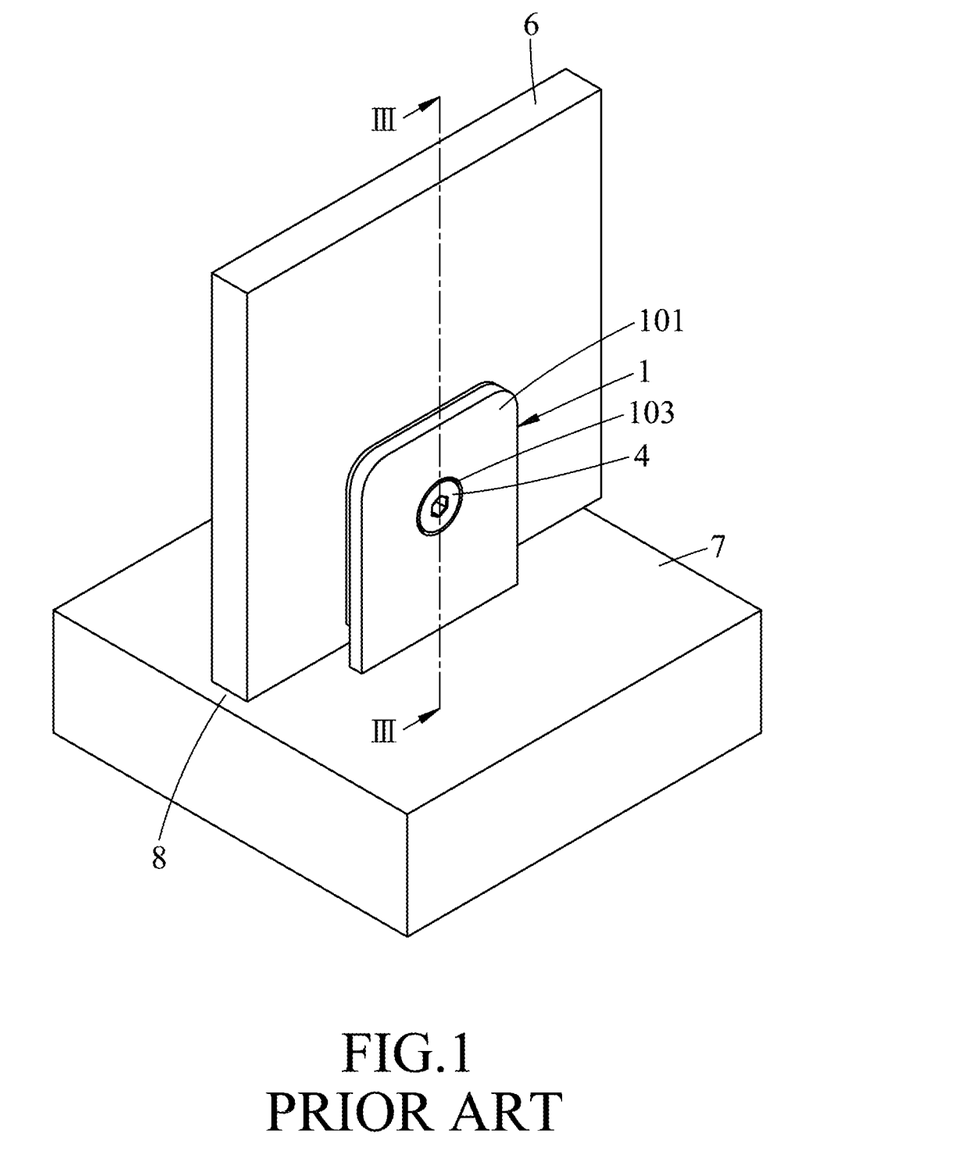
FIG. 1 is a perspective view illustrating a conventional glass clamp installed on a plane and clamping a glass.
Figure 2:
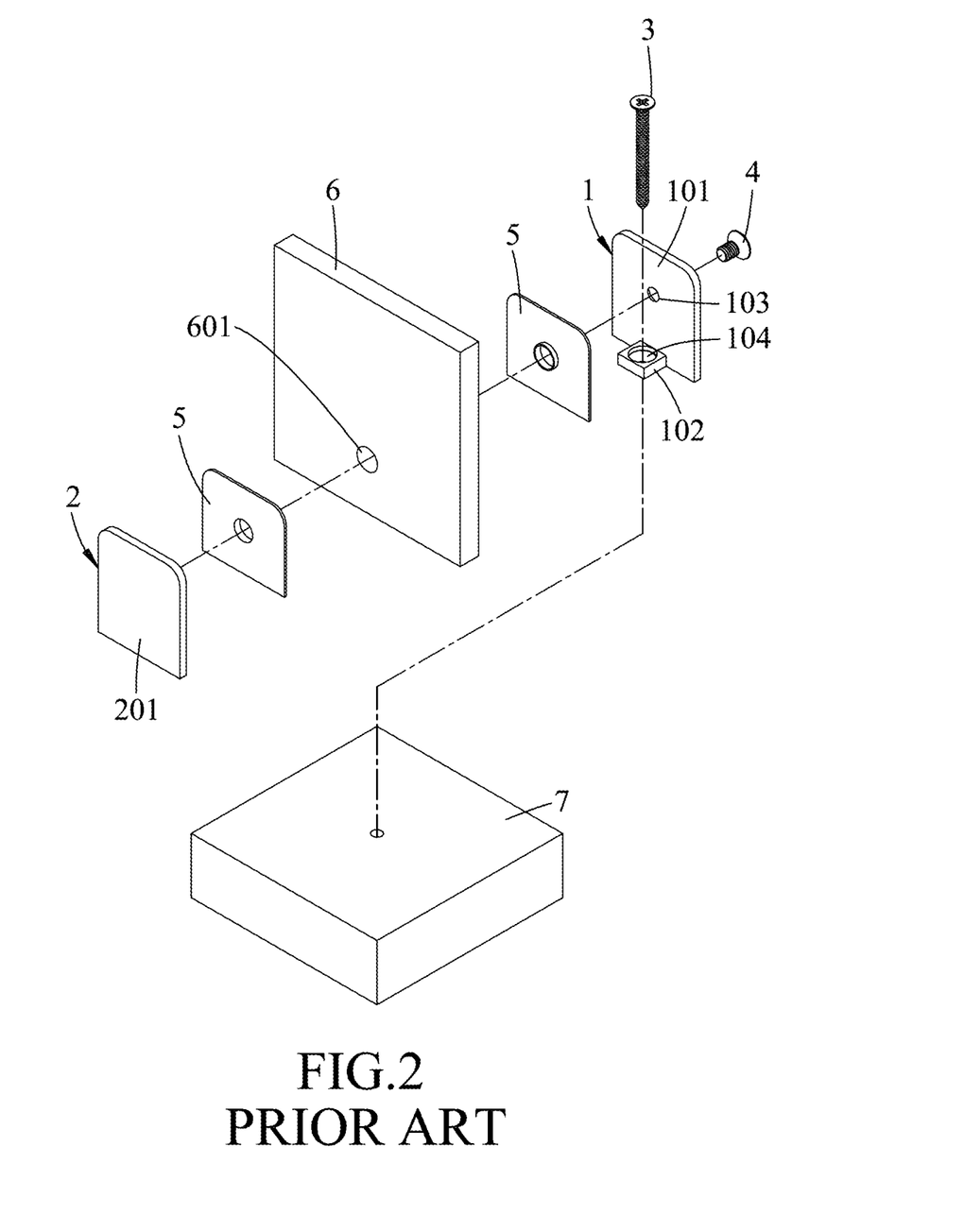
FIG. 2 is an exploded perspective view illustrating the conventional glass clamp.
Figure 3:
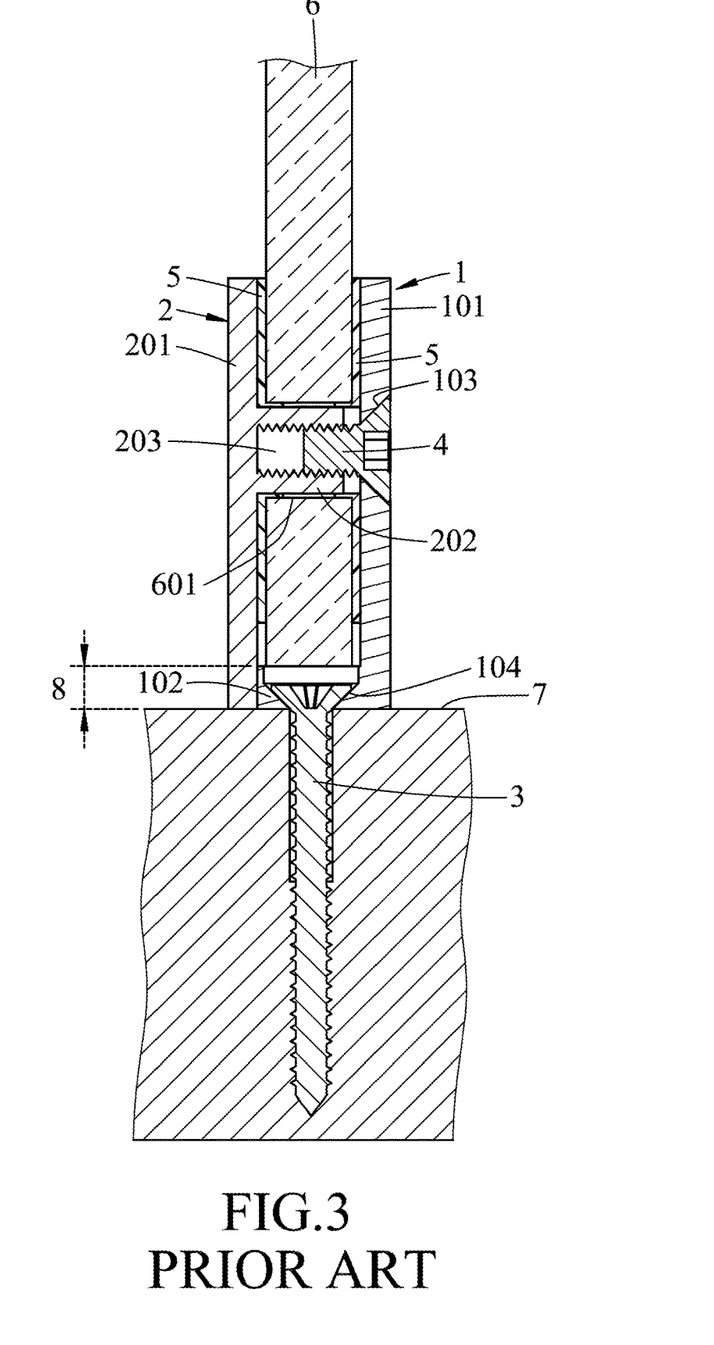
FIG. 3 is a sectional schematic view illustrating the conventional glass clamp.

Referring to FIGS. 1 to 3, a conventional glass clamp adapted to clamp a glass 6 is illustrated. The conventional glass clamp includes a first clamping block 1, a second clamping block 2, a fastener 3, a tightening bolt 4, and two shims 5. Each of the two shims 5 is disposed between the glass 6 and a respective one of the first and second clamping blocks 1 and 2. The first clamping block 1 has a wall portion 101 and a foot portion 102. The wall portion 101 of the first clamping block 1 is formed with a bolt through hole 103, and the foot portion 102 of the first clamping block 1 is formed with a fastener through hole 104. The second clamping block 2 has a wall portion 201, and an engagement portion 202 that is formed with a threaded engagement recess 203. The glass 6 is formed with a passage through hole 601. The fastener 3 passes through the fastener through hole 104 of the foot portion 102 of the first clamping block 1 so as to fasten the first clamping block 1 on an installation plane 7. The tightening bolt 4 passes through the bolt through hole 103 of the wall portion 101 of the first clamping block 1, and enters into the passage through hole 601 of the glass 6, so as to engage the threaded engagement recess 203 of the engagement portion 202 of the second clamping block 2. Therefore, the glass 6 is clamped between the wall portion 101 of the first clamping block 1 and the wall portion 201 of the second clamping block 2.

However, by utilizing the conventional glass clamp, the glass 6 has to be drilled to form the through hole 601 for passage of the tightening bolt 4, resulting in an increased cost of installation, and damaged integrity of the glass 6. Moreover, overall appearance of the conventional glass clamp may be adversely affected by the exposed tightening bolt 4. In addition, the foot portion 102 of the first clamping block 1 blocks the glass 6 from abutting against the installation plane 7, resulting in a gap 8 between the glass 6 and the installation plane 7 that has to be sealed. Furthermore, in order to clamp glasses with different thicknesses, different sizes of the tightening bolts 4 have to be prepared.

SUMMARY

Therefore, an object of the disclosure is to provide a clamp that can alleviate at least one of the drawbacks of the prior art.

According to the disclosure, the clamp is adapted to clamp an object and to be fastened on an installation plane by at least four fasteners. The clamp includes two clamping units spaced apart from each other. Each of the clamping units includes a supporting mount, a tightening block and at least one tightening bolt. The supporting mount has at least one inclined guide face that is configured to face the object to be clamped, and is formed with at least one engagement hole, and at least two through holes through which two of the fasteners respectively extend to engage the installation plane. The tightening block has at least one sliding face slidably abutting against the at least one inclined guide face of the supporting mount, and is formed with at least one passage hole to be aligned with the at least one engagement hole of the supporting mount. The at least one tightening bolt has a threaded portion, an outside diameter of which is smaller than an inside diameter of the at least one passage hole of the tightening block. The tightening block is fastened on the supporting mount by the at least one tightening bolt. The threaded portion of the at least one tightening bolt passes through the at least one passage hole of the tightening block to engage the at least one engagement hole of the supporting mount, so that the tightening block is compelled by the at least one tightening bolt to slidably move along the at least one inclined guide face of the supporting mount.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 4:
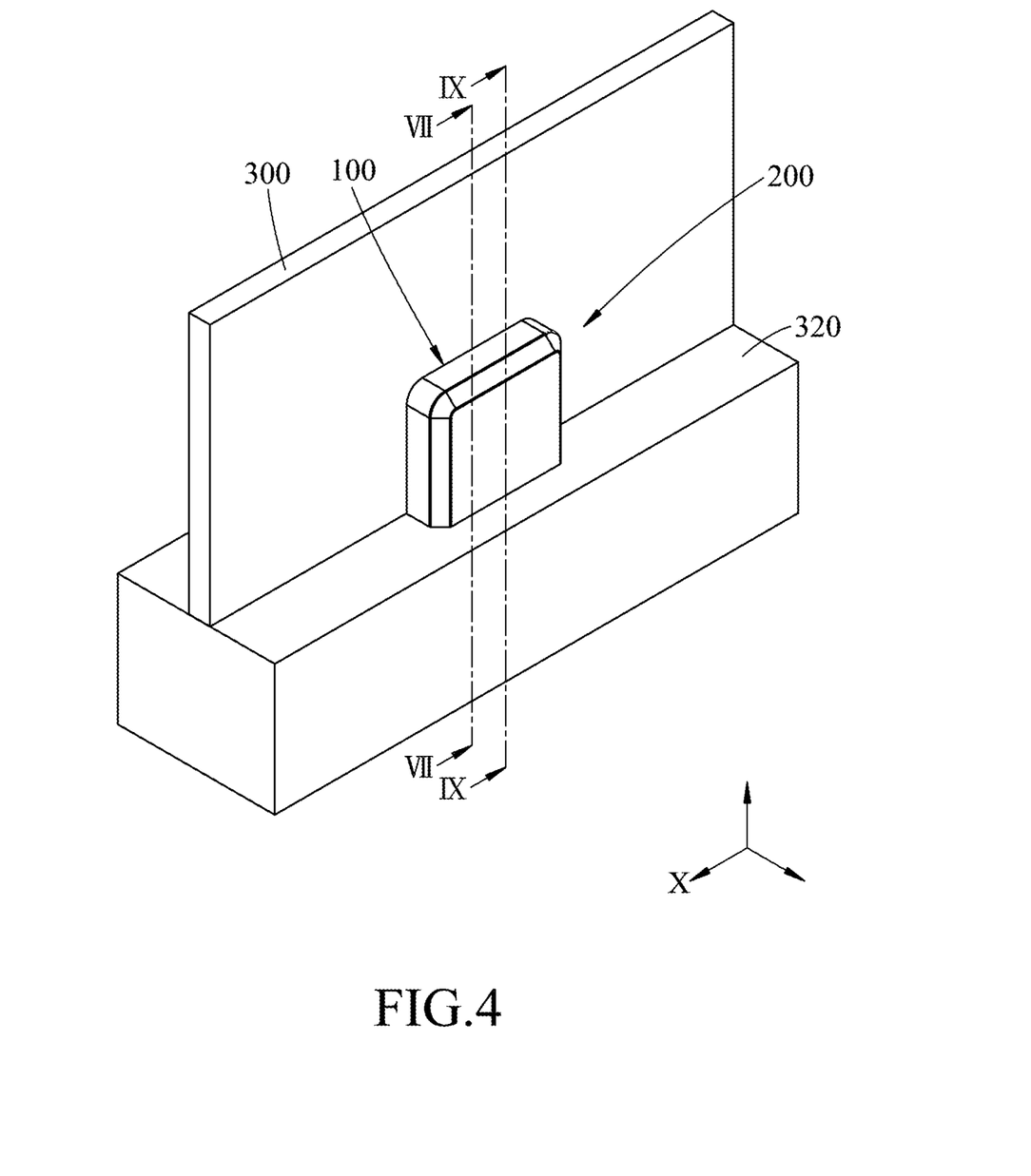
FIG. 4 is a perspective view illustrating an embodiment of a clamp installed on an installation plane and clamping a glass according to the disclosure.
Figure 5:
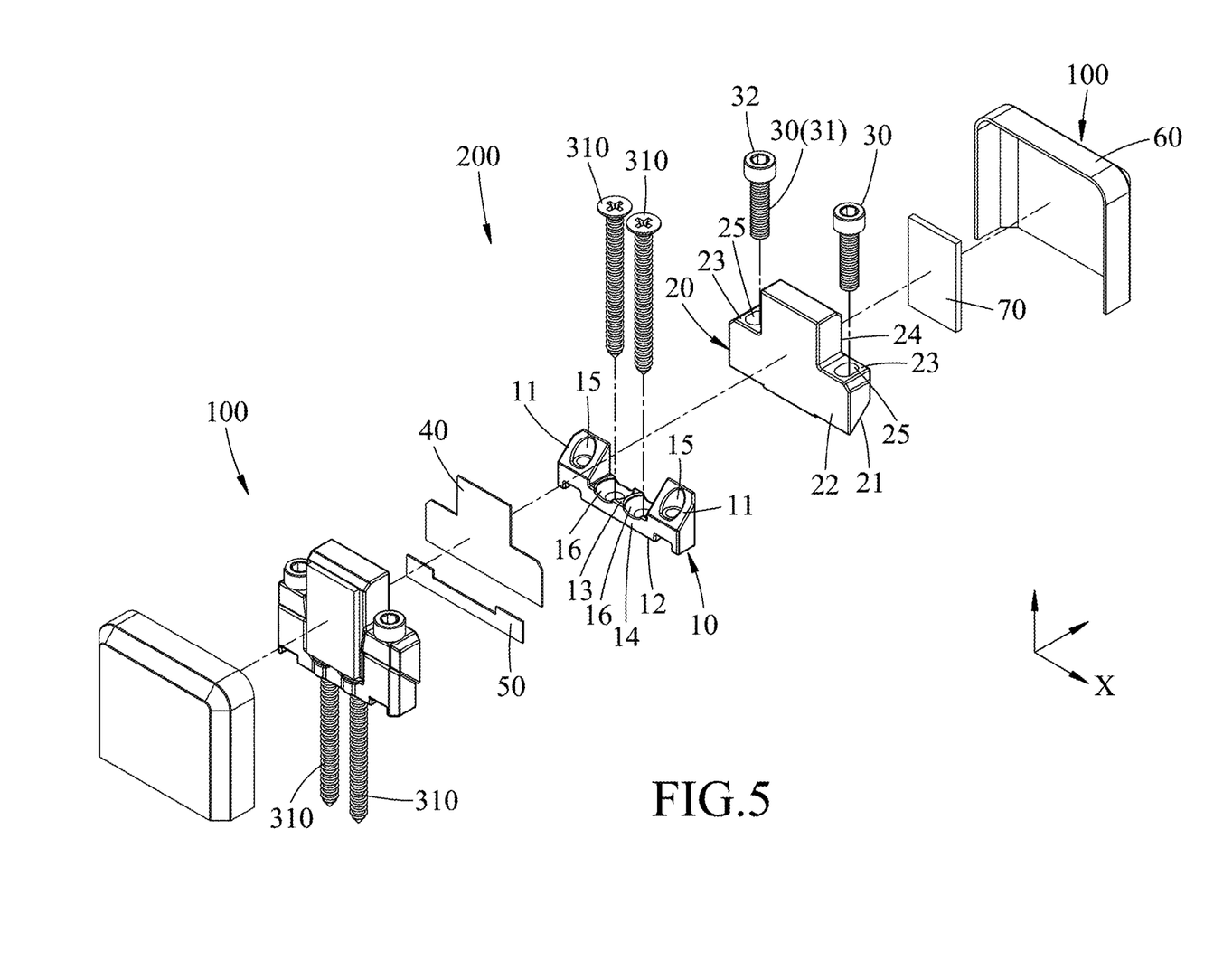
FIG. 5 is an exploded perspective view illustrating the clamp according to the disclosure.

Referring to FIGS. 4 and 5, an embodiment of a clamp 200 according to the disclosure is illustrated. The clamp 200 is adapted to clamp an object 300 and to be fastened on an installation plane 320 by four fasteners 310. In this embodiment, the object 300 is implemented to be apiece of glass, and the clamp 200 functions as a glass clamp. In this embodiment, the fasteners 310 are implemented to be screws, and the installation plane 320 is implemented to be the ground. However, implementations of the object 300, the fasteners 310 and the installation plane 320 are not limited to the disclosure herein and may vary in other embodiments.

Figure 6:
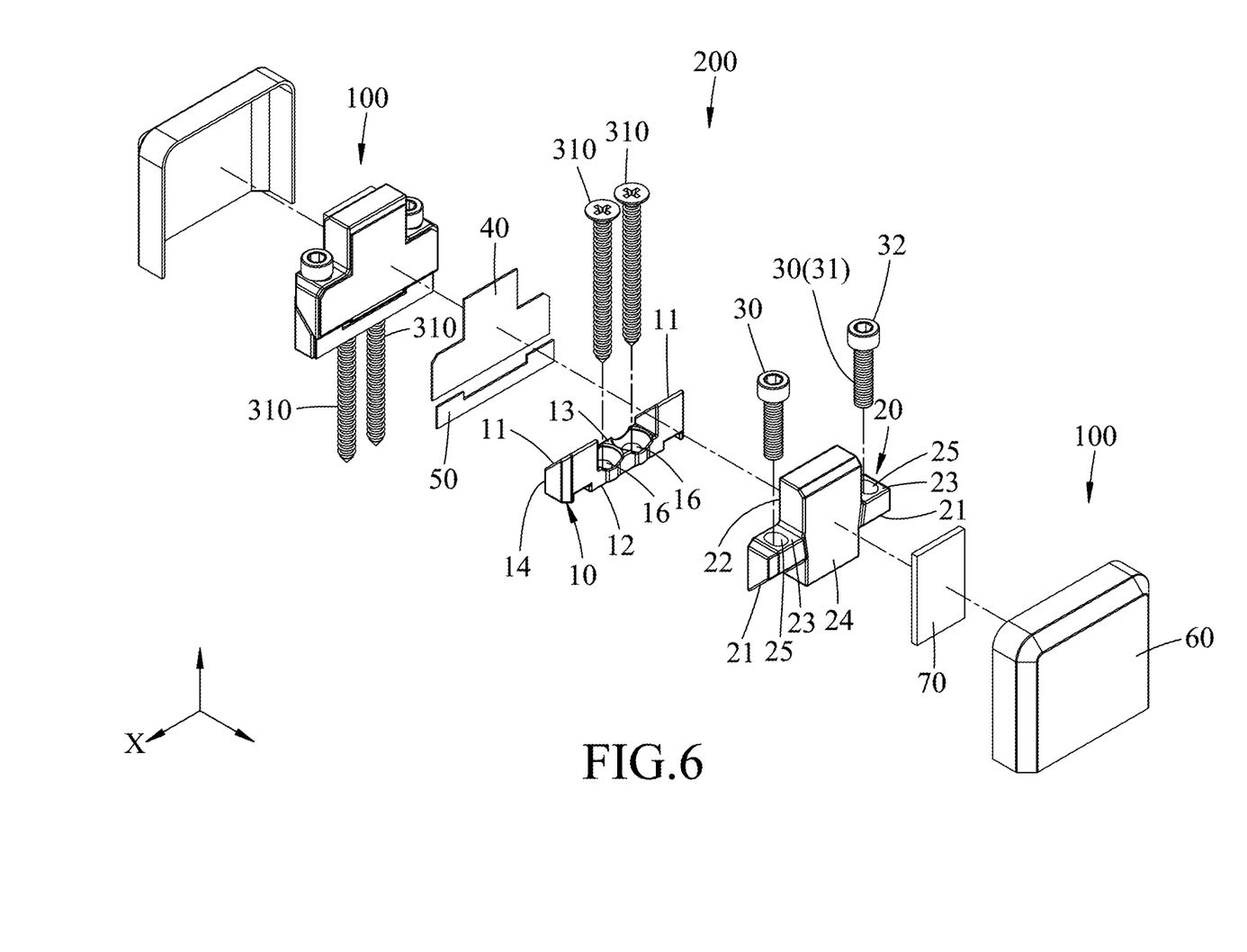
FIG. 6 is another exploded perspective view illustrating the clamp according to the disclosure.
Figure 7:
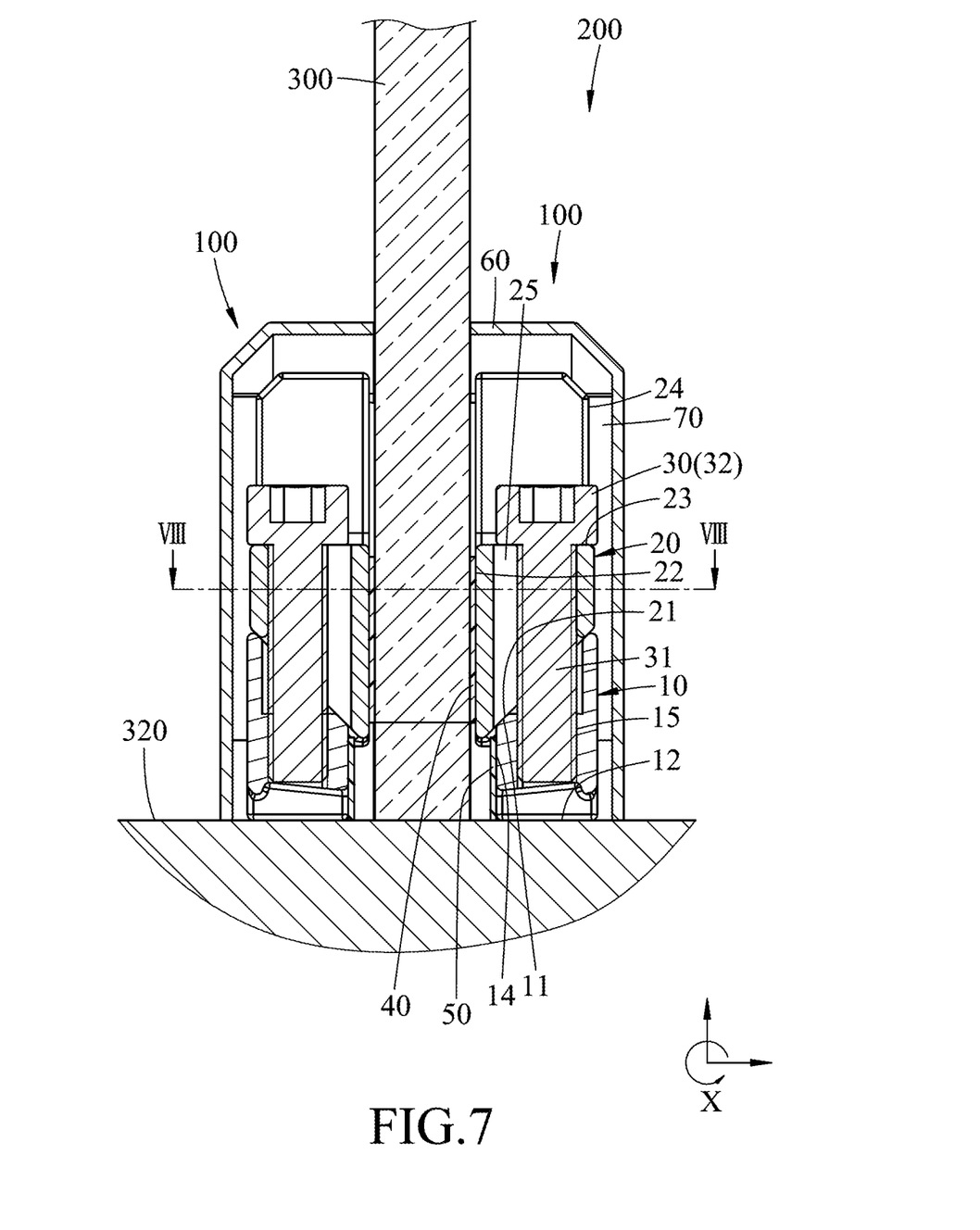
FIG. 7 is a sectional view illustrating a projection of the clamp onto a plane intersecting the camp at a line VII in FIG. 4, where the glass is clamped by tightening blocks.

Referring to FIGS. 5 to 7, the clamp 200 includes two clamping units 100 that are spaced apart from each other. Each of the clamping units 100 includes a supporting mount 10, a tightening block 20, two tightening bolts 30, an upper shim 40, a lower shim 50, a decoration cover 60 and an adhesive component 70.

The supporting mount 10 has two inclined guide faces 11 that are configured to face the object 300 (i.e., the glass) to be clamped and that are spaced apart from each other along a longitudinal direction (X) where the supporting mount 10 extends. The inclined guide faces 11 are located on a top side of the supporting mount 10. The supporting mount 10 further has a bottom face 12 that is opposite to the inclined guide faces 11 and that is adapted to contact the installation plane 320, a fastening face 13 that is between the inclined guide faces 11, and an inward plane 14 that is configured to face the object 300 to be clamped. The supporting mount 10 is formed with two engagement holes 15, and two through holes 16. The engagement holes 15 are spaced apart from each other along the longitudinal direction (X) and extend respectively from the inclined guide faces 11 to the bottom face 12. The through holes 16 are spaced apart from each other along the longitudinal direction (X) where the supporting mount 10 extends, and extend from the fastening face 13 to the bottom face 12. Two of the fasteners 310 respectively extend through the two through holes 16 to engage the installation plane 320 by, for example, screwing, such that the supporting mount 10 may be fastened to the installation plane 320. It should be noted that, in other embodiments, the number of the through holes 16 of the supporting mount 10 of each of the clamping units 100 may be more than two, and the number of the fasteners 310 corresponding to the through holes 16 may be more than four in total.

Referring to FIGS. 5 to 7, the tightening block 20 is to be fastened on top of the supporting mount 10. The tightening block 20 has two sliding faces 21 that are located on a bottom side of the tightening block 20. The sliding faces 21 are spaced apart from each other along a longitudinal direction (X) where the tightening block 20 extends, and respectively correspond to the two inclined guide faces 11 of the supporting mount 10. When the tightening block 20 is combined with the supporting mount 10, the two sliding faces 21 slidably abut against the inclined guide faces 11 of the supporting mount 10, respectively. The tightening block 20 further has an abutting plane 22 configured to face the object 300 to be clamped, two abutment faces 23 that are respectively opposite to the sliding faces 21, and an external plane 24 that is opposite to the abutting plane 22. The tightening block 20 is formed with two passage holes 25 that are aligned respectively with the engagement holes 15 of the supporting mount 10. The passage holes 25 are spaced apart from each other along the longitudinal direction (X) where the tightening block 20 extends, and extend from the respective abutment faces 23 to the respective sliding faces 21.

Figure 8:
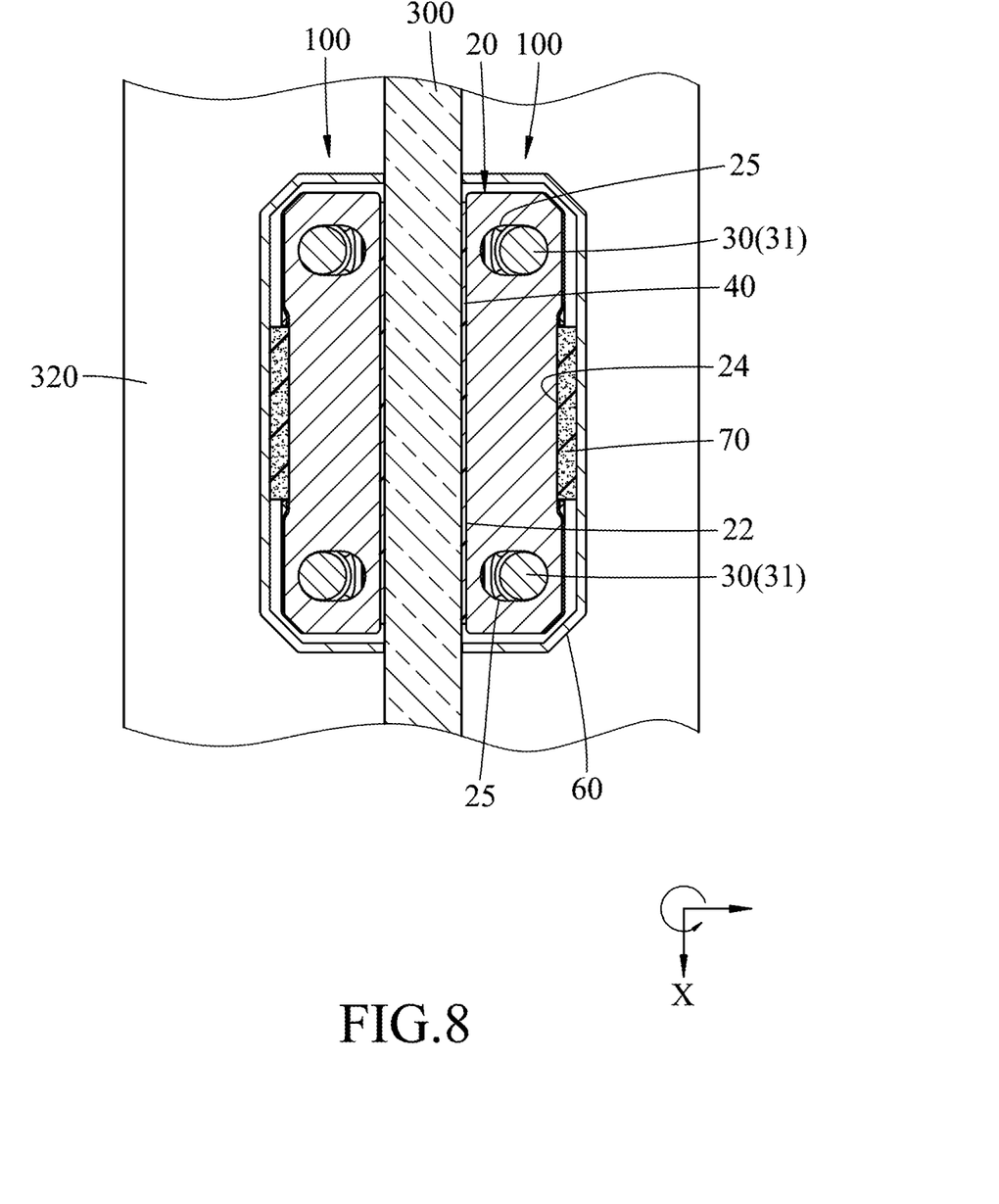
FIG. 8 is another sectional view illustrating projection of the clamp onto a plane intersecting the clamp at a line VIII in FIG. 7.

Referring to FIGS. 7 and 8, each of the tightening bolts 30 has a threaded portion 31 and a head portion 32 connected to the threaded portion 31. A maximum diameter of the threaded portion 31 of each of the tightening bolts 30 is smaller than a diameter of a respective one of the passage holes 25 of the tightening block 20. The threaded portion of each of the tightening bolts 30 passes through a respective one of the passage holes 25 of the tightening block 20 to engage a respective one of the engagement holes 15 of the supporting mount 10 by, for example, thread engagement. The head portion 32 of each of the tightening bolts 30 abuts against a respective one of the abutment faces 23 of the tightening block 20, so that the tightening block 20 is fastened on the supporting mount 10 by the tightening bolts 30, and so that the tightening block 20 is compelled by the tightening bolts 30 to slidably move along the inclined guide faces 11 of the supporting mount 10. In this way, the object 300 (i.e., the glass) does not have to be drilled in order to be clamped, reducing cost of installation.

Referring back to FIGS. 5 to 7, the upper shim 40 is disposed on the abutting plane 22 of the tightening block 20. The lower shim 50 is disposed on the inward plane 14 of the supporting mount 10. The upper shim 40 and the lower shim 50 are configured to protect the object 300 from being damaged when the object 300 is clamped between the clamping units 100. In this embodiment, the upper shim 40 and the lower shim 50 are both made of plastic, but implementations of the upper shim 40 and the lower shim 50 are not limited thereto and may vary in other embodiments.

Referring back to FIGS. 4 and 6 to 8, the adhesive component 70 is disposed between the decoration cover 60 and the external plane 24 of the tightening block 20, and adheres the decoration cover 60 to the external plane 24, so that the decoration cover 60 covers the tightening block 20, the supporting mount 10 and the tightening bolts 30. In this embodiment, the adhesive component 70 is implemented to be a foam tape, but implementation of the adhesive component 70 is not limited thereto and may vary in other embodiments. Covered by the decoration cover 60, fasteners or screws are hidden, improving aesthetic appearance of the clamp.

Figure 9:
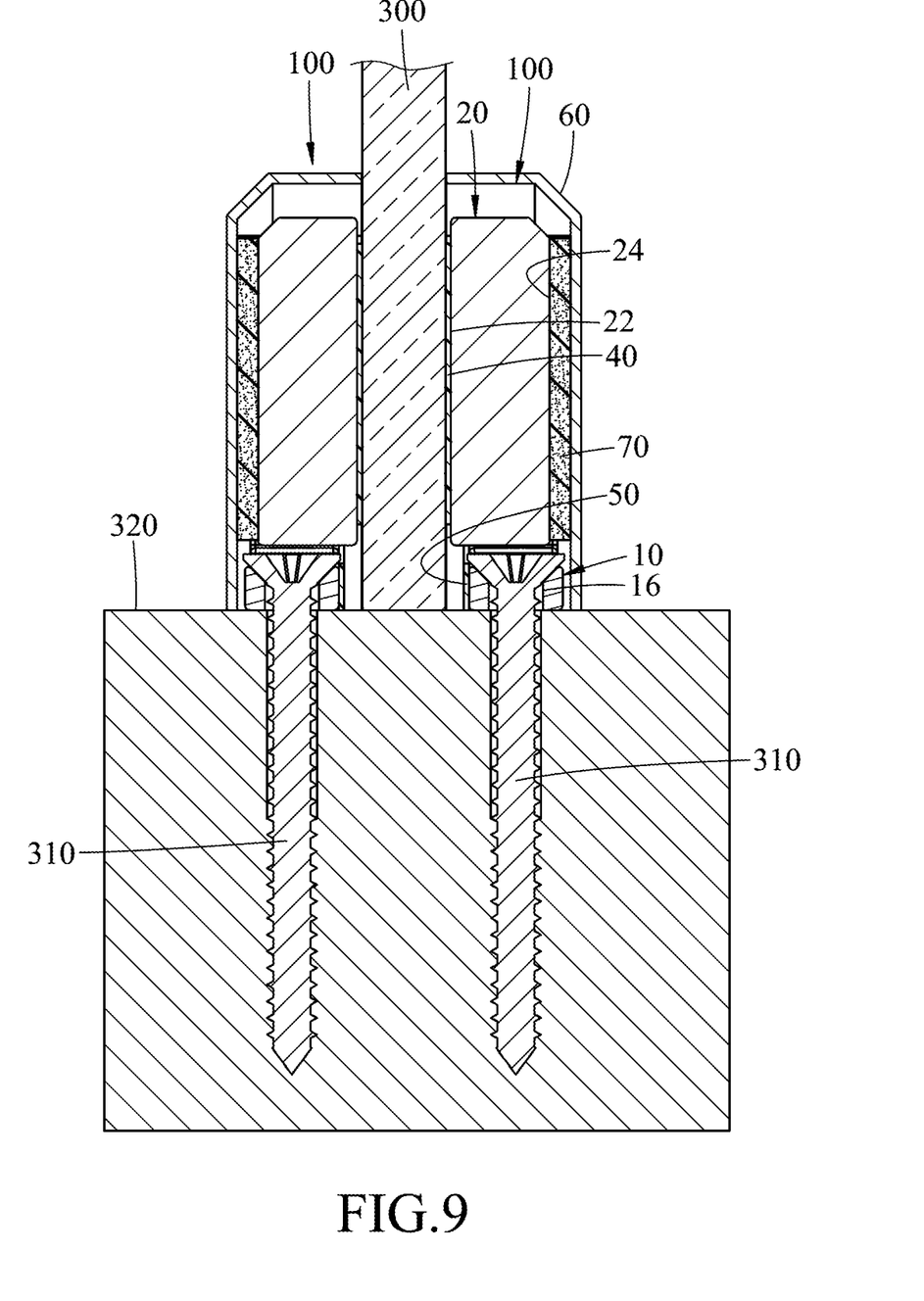
FIG. 9 is still another sectional view illustrating a projection of the clamp onto a plane intersecting the clamp at a line IX in FIG. 4.
Figure 10:
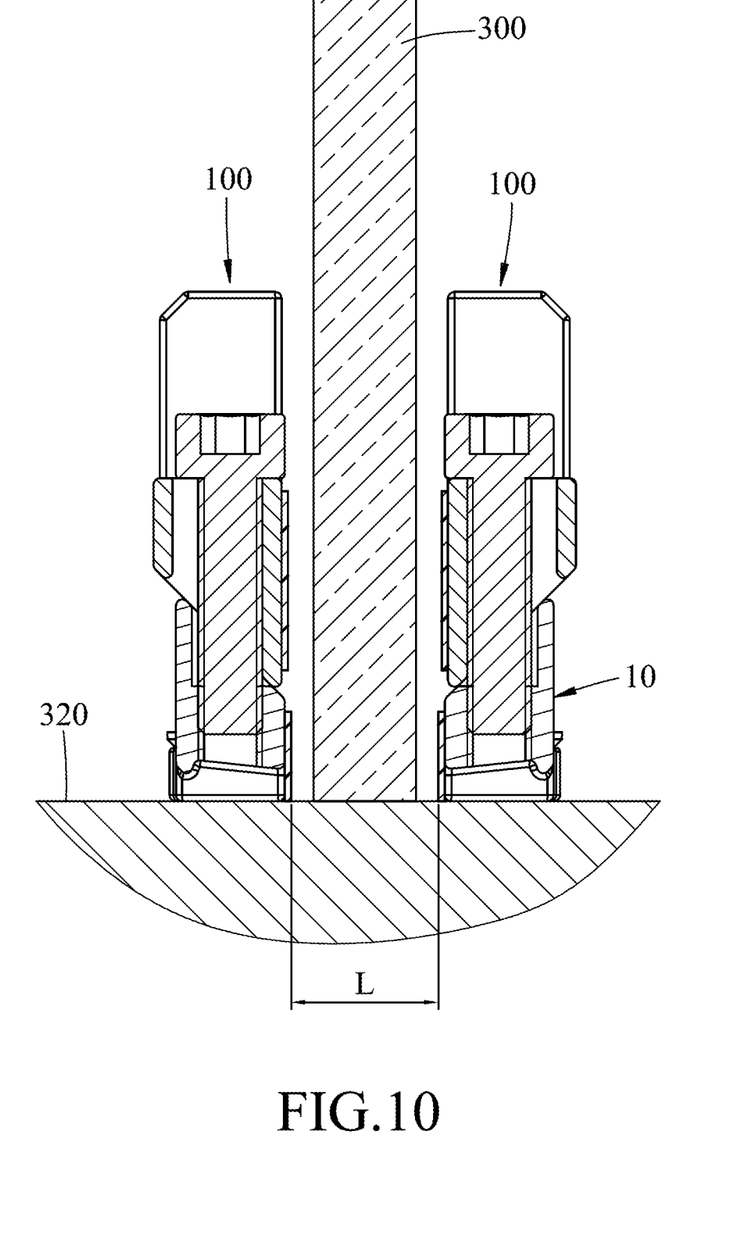
FIG. 10 is further another sectional view similar to the sectional view as shown in FIG. 7, where the glass is not clamped by the tightening blocks.

An example of utilizing the clamp 200 of this disclosure is described as follows. Referring to FIG. 10, to clamp the object 300 by the two clamping units 100 of the clamp 200, the two clamping units 100 of the clamp 200 is initially spaced apart from each other by a certain distance (L) so that the object 300 can be disposed between the two clamping units 100. Then, as shown in FIG. 9, the supporting mounts 10 of the clamping units 100 are fastened on the installation plane 320 by the fasteners 310. As shown in FIG. 7, after the object 300 is disposed between the two clamping units 100, and after the tightening blocks 20 are disposed on the supporting mounts 10, respectively, the tightening bolts 30 are screwed toward the installation plane 320 to compel the tightening block 20 of each of the clamping units 100 to slidably move along the inclined guide faces 11 of the supporting mount 10, and to move toward the object 300 and the installation plane 320, so that the object 300 is clamped between the upper shims 40 disposed on the respective abutting planes 22 of the respective tightening blocks 20. Thereafter, for each of the clamping units 100, the decoration cover 60 is adhered to the supporting mount 20 by the adhesive component 70 and abuts against the object 300 as shown in FIG. 4.

It is worth to note that aside from reducing cost of installation and improving aesthetic appearance of the clamp 200, the clamp 200 of this disclosure further has the following advantages. By utilizing the clamp 200 of this disclosure, the object 300 directly contacts the installation plane 320, leaving no gap therebetween. Therefore, it is not necessary to seal any gap when the clamp 200 of this disclosure is used to clamp the object 300, facilitating installation of the clamp of this disclosure. In addition, the clamp of this disclosure is suitable for clamping objects 300 with different thicknesses without the need to replace any component of the clamp 200, so flexibility of use is thereby enhanced.

In summary, the clamp of this disclosure utilizes the tightening bolts to compel the tightening blocks to move along the inclined guide faces of the supporting mounts so as to clamp the object between the tightening blocks.

In the description above, for the purposes of explanation, numerous specific details have been set forth in order to provide a thorough understanding of the embodiment. It will be apparent, however, to one skilled in the art, that one or more other embodiments may practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connect ion with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A clamp adapted to clamp an object and to be fastened on an installation plane by at least four fasteners, said clamp comprising:
    two clamping units spaced apart from each other, each of said clamping units including
        a supporting mount that has at least one inclined guide face which is configured to face the object to be clamped, and that is formed with at least one engagement hole, and at least two through holes through which two of the fasteners respectively extend to engage the installation plane,
        a tightening block that has at least one sliding face slidably abutting against said at least one inclined guide face of said supporting mount, and that is formed with at least one passage hole to be aligned with said at least one engagement hole of said supporting mount, and
        at least one tightening bolt that has a threaded portion, an maximum diameter of which is smaller than a diameter of said at least one passage hole of said tightening block;
    wherein said tightening block is fastened on said supporting mount by said at least one tightening bolt, said threaded portion of which passes through said at least one passage hole of said tightening block to engage said at least one engagement hole of said supporting mount, so that said tightening block is compelled by said at least one tightening bolt to slidably move along said at least one inclined guide face of said supporting mount.

2. The clamp as claimed in claim 1, wherein for each of said clamping units:
    said supporting mount further has a bottom face opposite to said at least one inclined guide face and adapted to contact the installation plane;
    said at least one inclined guide face is two in number, said inclined guide faces being spaced apart from each other along a longitudinal direction where said supporting mount extends;
    said at least one engagement hole is two in number, said engagement holes being spaced apart from each other along the longitudinal direction and extending respectively from said inclined guide faces to said bottom face;
    said at least one sliding face is two in number, said sliding faces being spaced apart from each other along a longitudinal direction where said tightening block extends, and respectively corresponding to said two inclined guide faces of said supporting mount;
    said tightening block further has two abutment faces respectively opposite to said sliding faces;
    said at least one passage hole is two in number, said passage holes being spaced apart from each other along the longitudinal direction where said tightening block extends, and extending from said abutment faces to said sliding faces, respectively; and
    said at least one tightening bolt of each of said clamping units is two in number, the threaded portion of each of said tightening bolt passing through a respective one of said passage holes of said tightening block to engage a respective one of said engagement holes of said supporting mount.

3. The clamp as claimed in claim 2, wherein:
    each of said tightening bolts further has a head portion that is adjacent to said threaded port ion thereof, and that abuts against a respective one of said abutment faces of said tightening block.

4. The clamp as claimed in claim 3, wherein:
    said supporting mount further has a fastening face between said inclined guide faces; and
    said at least two through holes are two in number, said through holes being spaced apart from each other along the longitudinal direction where said supporting mount extends, and extending from said fastening face to said bottom face.

5. The clamp as claimed in claim 2, wherein:
    said tightening block further has an abutting plane configured to face the object to be clamped;
    said supporting mount further has an inward plane configured to face the object to be clamped; and
    each of said clamping units further includes an upper shim that is disposed on said abutting plane of said tightening block, and a lower shim that is disposed on said inward plane of said supporting mount.

6. The clamp as claimed in claim 5, wherein:
    said tightening block further has an external plane opposite to said abutting plane; and
    each of said clamping units further includes a decoration cover, and an adhesive component that is disposed between said decoration cover and said external plane of said tightening block, and that adheres said decoration cover to said external plane, so that said decoration cover covers said tightening block, said supporting mount and said tightening bolts.

7. The clamp as claimed in claim 1, wherein:
    said tightening block is fastened on top of said supporting mount, said at least one sliding face is located on a bottom side of said tightening block; and
    said at least one inclined guide face is located on a top side of said supporting mount.

* * * * *